(12) United States Patent
Napolitano et al.

(10) Patent No.: US 9,689,681 B2
(45) Date of Patent: Jun. 27, 2017

(54) SYSTEM AND METHOD FOR VEHICLE OPERATION

(71) Applicant: GENERAL ELECTRIC COMPANY, Schenectady, NY (US)

(72) Inventors: James Andrew Napolitano, Erie, PA (US); Brian Nedward Meyer, Fairview, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/457,304

(22) Filed: Aug. 12, 2014

(65) Prior Publication Data

US 2016/0047656 A1    Feb. 18, 2016

(51) Int. Cl.
*G01C 21/00* (2006.01)
*B60L 7/12* (2006.01)
(Continued)

(52) U.S. Cl.
CPC ............... *G01C 21/00* (2013.01); *B60L 7/12* (2013.01); *B60L 7/24* (2013.01); *B60L 15/2045* (2013.01);
(Continued)

(58) Field of Classification Search
CPC ... G01C 21/00; B60L 7/12; B60L 7/24; B60L 15/2045; B60L 2200/26; B60L 2240/12; B60L 2240/44; B60L 2240/662
(Continued)

(56) References Cited

U.S. PATENT DOCUMENTS

| 2,059,160 A | 10/1936 | Wintsch |
| 2,104,601 A | 1/1938 | Young |

(Continued)

FOREIGN PATENT DOCUMENTS

| CA | 2627074 | 5/2007 |
| DE | 102005051077 | 10/2005 |

(Continued)

OTHER PUBLICATIONS

Unofficial English translation of Search Report issued in connection with corresponding EA Application No. 201591274 on Feb. 10, 2016.

*Primary Examiner* — Aaron L Troost
(74) *Attorney, Agent, or Firm* — Global Patent Operation; John A. Kramer

(57) ABSTRACT

A system includes an energy management processing unit that includes a trip planning module, a plurality of estimator modules, and an arbiter module. The trip planning module plans a trip profile specifying power settings based on trip data including a plurality of parameters having expected values. Each of the estimator modules generates an estimation re-plan request when the difference between an expected and experienced respective trip planning parameter value exceeds a threshold. The arbiter module receives at least one estimation re-plan request from the plurality of estimator modules, determines whether a re-plan is to be performed based on at least one of a state of the vehicle system or additional estimation re-plan requests, and provides an arbitrated re-plan request to the trip planning module for re-planning the trip profile when it is determined that a re-plan is to be performed.

21 Claims, 4 Drawing Sheets

(51) Int. Cl.
*B60L 7/24* (2006.01)
*B60L 15/20* (2006.01)

(52) U.S. Cl.
CPC ....... *B60L 2200/26* (2013.01); *B60L 2240/12* (2013.01); *B60L 2240/662* (2013.01); *B60L 2260/44* (2013.01)

(58) Field of Classification Search
USPC ........................................................ 701/400
See application file for complete search history.

(56) References Cited

U.S. PATENT DOCUMENTS

| | | |
|---|---|---|
| 2,104,652 A | 1/1938 | Inman |
| 2,111,513 A | 3/1938 | Phinney |
| 2,148,005 A | 2/1939 | Allen et al. |
| 2,233,932 A | 3/1941 | Allen |
| 2,289,857 A | 7/1942 | Allen |
| 2,293,926 A | 8/1942 | Wallace |
| 2,366,802 A | 1/1945 | Pflasterer |
| 2,601,634 A | 6/1952 | Rivette |
| 2,628,335 A | 2/1953 | Drake |
| 2,783,369 A | 2/1957 | Weber |
| 2,925,552 A | 2/1960 | Cowan et al. |
| 2,927,711 A | 3/1960 | Naggiar |
| 3,016,464 A | 1/1962 | Bailey |
| 3,137,756 A | 6/1964 | Gunther et al. |
| 3,246,141 A | 4/1966 | Ehrlich |
| 3,393,600 A | 7/1968 | Bess |
| 3,508,496 A | 4/1970 | Larson |
| 3,517,307 A | 6/1970 | Wallen, Jr. et al. |
| 3,519,805 A | 7/1970 | Throne-Booth |
| 3,537,401 A | 11/1970 | Metzner |
| 3,562,419 A | 2/1971 | Stewart et al. |
| 3,575,596 A | 4/1971 | Schatzel |
| 3,589,815 A | 6/1971 | Hosterman |
| 3,594,912 A | 7/1971 | Sauterel |
| 3,604,359 A | 9/1971 | Doorley et al. |
| 3,633,010 A | 1/1972 | Svetlichny |
| 3,650,216 A | 3/1972 | Harwick et al. |
| 3,655,962 A | 4/1972 | Koch |
| 3,696,243 A | 10/1972 | Risely |
| 3,718,040 A | 2/1973 | Freeman et al. |
| 3,781,139 A | 12/1973 | Lohse |
| 3,791,473 A | 2/1974 | Rosen |
| 3,794,833 A | 2/1974 | Blazek et al. |
| 3,805,056 A | 4/1974 | Birkin |
| 3,813,885 A | 6/1974 | Tabor |
| 3,821,558 A | 6/1974 | Mansfield |
| 3,821,932 A | 7/1974 | Theurer et al. |
| 3,828,440 A | 8/1974 | Plasser et al. |
| 3,850,390 A | 11/1974 | Geiger |
| 3,864,039 A | 2/1975 | Wilmarth |
| 3,865,042 A | 2/1975 | DePaola et al. |
| 3,870,952 A | 3/1975 | Sibley |
| 3,875,865 A | 4/1975 | Plasser et al. |
| 3,886,870 A | 6/1975 | Pelabon |
| 3,896,665 A | 7/1975 | Goel |
| 3,924,461 A | 12/1975 | Stover |
| 3,937,068 A | 2/1976 | Joy |
| 3,937,432 A | 2/1976 | Birkin |
| 3,948,314 A | 4/1976 | Creswick et al. |
| 3,960,005 A | 6/1976 | Vezina |
| 3,962,908 A | 6/1976 | Joy |
| 3,974,991 A | 8/1976 | Geiger |
| 3,987,989 A | 10/1976 | Geiger |
| 3,995,560 A | 12/1976 | Mackintosh |
| 4,003,019 A | 1/1977 | Tronel |
| 4,005,601 A | 2/1977 | Botello |
| 4,005,838 A | 2/1977 | Grundy |
| 4,022,408 A | 5/1977 | Staples |
| 4,040,738 A | 8/1977 | Wagner |
| 4,041,283 A | 8/1977 | Mosier |
| 4,042,810 A | 8/1977 | Mosher |
| 4,044,594 A | 8/1977 | Owens et al. |
| 4,062,419 A | 12/1977 | Kadota |
| 4,069,590 A | 1/1978 | Effinger |
| 4,075,632 A | 2/1978 | Baldwin et al. |
| 4,100,795 A | 7/1978 | Panetti |
| 4,117,463 A | 9/1978 | Norton |
| 4,117,529 A | 9/1978 | Stark et al. |
| 4,136,432 A | 1/1979 | Melley, Jr. |
| 4,143,553 A | 3/1979 | Martens et al. |
| 4,145,018 A | 3/1979 | Poggio et al. |
| 4,155,176 A | 5/1979 | Goel et al. |
| 4,159,088 A | 6/1979 | Cosley |
| 4,165,648 A | 8/1979 | Pagano |
| 4,173,073 A | 11/1979 | Fukazawa et al. |
| 4,174,636 A | 11/1979 | Pagano |
| 4,181,278 A | 1/1980 | Pascoe |
| 4,181,430 A | 1/1980 | Shirota et al. |
| 4,181,943 A | 1/1980 | Mercer, Sr. et al. |
| 4,198,164 A | 4/1980 | Cantor |
| 4,207,569 A | 6/1980 | Meyer |
| 4,214,647 A | 7/1980 | Lutts |
| 4,222,275 A | 9/1980 | Sholl et al. |
| 4,229,978 A | 10/1980 | Sholl et al. |
| 4,235,112 A | 11/1980 | Kaiser |
| 4,241,403 A | 12/1980 | Schultz |
| 4,253,399 A | 3/1981 | Spigarelli |
| 4,259,018 A | 3/1981 | Poirier |
| 4,262,209 A | 4/1981 | Berner |
| 4,279,395 A | 7/1981 | Boggio et al. |
| 4,288,855 A | 9/1981 | Panetti |
| 4,306,694 A | 12/1981 | Kuhn |
| 4,324,376 A | 4/1982 | Kuhn |
| 4,344,364 A | 8/1982 | Nickles et al. |
| 4,355,582 A | 10/1982 | Germer |
| 4,360,873 A | 11/1982 | Wilde et al. |
| 4,361,202 A | 11/1982 | Minovitch |
| 4,383,448 A | 5/1983 | Fujimoto et al. |
| 4,389,033 A | 6/1983 | Hardman |
| 4,391,134 A | 7/1983 | Theurer et al. |
| 4,401,035 A | 8/1983 | Spigarelli et al. |
| 4,417,466 A | 11/1983 | Panetti |
| 4,417,522 A | 11/1983 | Theurer et al. |
| 4,425,097 A | 1/1984 | Owens |
| 4,429,576 A | 2/1984 | Norris |
| 4,430,615 A | 2/1984 | Calvert |
| 4,457,178 A | 7/1984 | Turbe et al. |
| 4,467,430 A | 8/1984 | Even et al. |
| 4,468,966 A | 9/1984 | Bradshaw |
| 4,487,071 A | 12/1984 | Pagano et al. |
| 4,490,038 A | 12/1984 | Theurer et al. |
| 4,524,745 A | 6/1985 | Tominari et al. |
| 4,531,837 A | 7/1985 | Panetti |
| 4,538,061 A | 8/1985 | Jaquet |
| 4,541,182 A | 9/1985 | Panetti |
| 4,548,070 A | 10/1985 | Panetti |
| 4,548,164 A | 10/1985 | Ylonen et al. |
| 4,561,057 A | 12/1985 | Haley, Jr. et al. |
| 4,565,548 A | 1/1986 | Davis et al. |
| 4,577,494 A | 3/1986 | Jaeggi |
| 4,578,665 A | 3/1986 | Yang |
| 4,582,280 A | 4/1986 | Nichols et al. |
| 4,582,580 A | 4/1986 | Goudal et al. |
| 4,593,569 A | 6/1986 | Joy |
| 4,602,335 A | 7/1986 | Perlmutter |
| 4,609,870 A | 9/1986 | Lale et al. |
| 4,615,218 A | 10/1986 | Pagano |
| 4,625,412 A | 12/1986 | Bradshaw |
| 4,644,705 A | 2/1987 | Saccomani et al. |
| 4,654,973 A | 4/1987 | Worthy |
| 4,655,142 A | 4/1987 | Theurer et al. |
| 4,662,224 A | 5/1987 | Turbe |
| 4,663,713 A | 5/1987 | Cornell et al. |
| 4,689,995 A | 9/1987 | Turbe |
| 4,691,565 A | 9/1987 | Theurer |
| 4,700,223 A | 10/1987 | Shoutaro et al. |
| 4,700,574 A | 10/1987 | Turbe |
| 4,711,418 A | 12/1987 | Aver, Jr. et al. |
| 4,718,351 A | 1/1988 | Engle |
| 4,723,738 A | 2/1988 | Franke |
| 4,728,063 A | 3/1988 | Petit et al. |

(56) References Cited

U.S. PATENT DOCUMENTS

| | | |
|---|---|---|
| 4,735,384 A | 4/1988 | Elliott |
| 4,735,385 A | 4/1988 | Nickles et al. |
| 4,741,207 A | 5/1988 | Spangler |
| 4,763,526 A | 8/1988 | Pagano |
| 4,773,590 A | 9/1988 | Dash et al. |
| 4,794,548 A | 12/1988 | Lynch et al. |
| 4,827,438 A | 5/1989 | Nickles et al. |
| 5,588,716 A | 12/1996 | Stumpe |
| 6,067,496 A | 5/2000 | Benoliel et al. |
| 6,691,957 B2 | 2/2004 | Hess, Jr. et al. |
| 6,862,502 B2 | 3/2005 | Peltz et al. |
| 7,021,588 B2 | 4/2006 | Hess, Jr. et al. |
| 7,395,141 B1 | 7/2008 | Seck et al. |
| 8,295,993 B2 | 10/2012 | Kumar |
| 8,370,006 B2 | 2/2013 | Kumar et al. |
| 8,655,519 B2 | 2/2014 | Cooper et al. |
| 2001/0001131 A1 | 5/2001 | Miller |
| 2001/0019263 A1 | 9/2001 | Kwun et al. |
| 2001/0026321 A1 | 10/2001 | Goto |
| 2001/0045495 A1 | 11/2001 | Olson et al. |
| 2001/0047241 A1 | 11/2001 | Khavakh et al. |
| 2002/0010531 A1 | 1/2002 | Hawthorne et al. |
| 2002/0059075 A1 | 5/2002 | Schick et al. |
| 2002/0062819 A1 | 5/2002 | Takahashi |
| 2002/0065698 A1 | 5/2002 | Schick et al. |
| 2002/0072833 A1 | 6/2002 | Gray |
| 2002/0096081 A1 | 7/2002 | Kraft |
| 2002/0103585 A1 | 8/2002 | Biess et al. |
| 2002/0104779 A1 | 8/2002 | Connor et al. |
| 2002/0107618 A1 | 8/2002 | Deguchi et al. |
| 2002/0113170 A1 | 8/2002 | Grappone |
| 2002/0148931 A1 | 10/2002 | Anderson |
| 2002/0157901 A1 | 10/2002 | Kast et al. |
| 2002/0174653 A1 | 11/2002 | Uzkan |
| 2002/0188397 A1 | 12/2002 | Biess et al. |
| 2002/0195086 A1 | 12/2002 | Beck et al. |
| 2003/0000499 A1 | 1/2003 | Doelker et al. |
| 2003/0010872 A1 | 1/2003 | Lewin et al. |
| 2003/0020469 A1 | 1/2003 | Katragadda et al. |
| 2003/0038216 A1 | 2/2003 | Holgate |
| 2003/0055666 A1 | 3/2003 | Roddy et al. |
| 2003/0060968 A1 | 3/2003 | MacPhail et al. |
| 2003/0070492 A1 | 4/2003 | Buttle et al. |
| 2003/0076221 A1 | 4/2003 | Akiyama et al. |
| 2003/0091017 A1 | 5/2003 | Davenport et al. |
| 2003/0104899 A1 | 6/2003 | Keller |
| 2003/0105561 A1 | 6/2003 | Nickles et al. |
| 2003/0107548 A1 | 6/2003 | Eun et al. |
| 2003/0120400 A1 | 6/2003 | Baig et al. |
| 2003/0128030 A1 | 7/2003 | Hintze et al. |
| 2003/0139909 A1 | 7/2003 | Ozawa |
| 2003/0158640 A1 | 8/2003 | Pillar et al. |
| 2003/0183729 A1 | 10/2003 | Root et al. |
| 2003/0187694 A1 | 10/2003 | Rowen |
| 2003/0222981 A1 | 12/2003 | Kisak et al. |
| 2003/0229097 A1 | 12/2003 | Watkins et al. |
| 2003/0229446 A1 | 12/2003 | Boscamp et al. |
| 2003/0233959 A1 | 12/2003 | Kumar |
| 2003/0236598 A1 | 12/2003 | Antelo et al. |
| 2004/0010432 A1 | 1/2004 | Matheson et al. |
| 2004/0024515 A1 | 2/2004 | Troupe et al. |
| 2004/0024518 A1 | 2/2004 | Boley et al. |
| 2004/0025849 A1 | 2/2004 | West et al. |
| 2004/0026574 A1 | 2/2004 | Seifert |
| 2004/0034556 A1 | 2/2004 | Matheson et al. |
| 2004/0038831 A1 | 2/2004 | Eadie |
| 2004/0048620 A1 | 3/2004 | Nakahara et al. |
| 2004/0049339 A1 | 3/2004 | Kober et al. |
| 2004/0068359 A1 | 4/2004 | Neiss et al. |
| 2004/0073361 A1 | 4/2004 | Tzamaloukas et al. |
| 2004/0075280 A1 | 4/2004 | Kumar et al. |
| 2004/0095135 A1 | 5/2004 | Nejikovsky et al. |
| 2004/0098142 A1 | 5/2004 | Warren et al. |
| 2004/0107042 A1 | 6/2004 | Seick |
| 2004/0108814 A1 | 6/2004 | Tsuda et al. |
| 2004/0122569 A1 | 6/2004 | Bidaud |
| 2004/0129289 A1 | 7/2004 | Hafemann |
| 2004/0129840 A1 | 7/2004 | Horst |
| 2004/0133315 A1 | 7/2004 | Kumar et al. |
| 2004/0143374 A1 | 7/2004 | Horst et al. |
| 2004/0153221 A1 | 8/2004 | Kumar |
| 2004/0167687 A1 | 8/2004 | Kornick et al. |
| 2004/0172175 A1 | 9/2004 | Julich et al. |
| 2004/0174121 A1 | 9/2004 | Tsuda et al. |
| 2004/0238693 A1 | 12/2004 | Cole |
| 2004/0243664 A1 | 12/2004 | Horstemeyer |
| 2004/0245410 A1 | 12/2004 | Kisak et al. |
| 2004/0249571 A1 | 12/2004 | Blesener et al. |
| 2005/0004723 A1 | 1/2005 | Duggan et al. |
| 2005/0007020 A1 | 1/2005 | Tsuda et al. |
| 2005/0045058 A1 | 3/2005 | Donnelly et al. |
| 2005/0055157 A1 | 3/2005 | Scholl |
| 2005/0055287 A1 | 3/2005 | Schmidtberg et al. |
| 2005/0065674 A1 | 3/2005 | Houpt et al. |
| 2005/0065711 A1 | 3/2005 | Dahlgren et al. |
| 2005/0076716 A1 | 4/2005 | Turner |
| 2005/0090978 A1 | 4/2005 | Bathory et al. |
| 2005/0096797 A1 | 5/2005 | Matsubara et al. |
| 2005/0099323 A1 | 5/2005 | Hirose |
| 2005/0107954 A1 | 5/2005 | Nahla |
| 2005/0109882 A1 | 5/2005 | Armbruster et al. |
| 2005/0120904 A1 | 6/2005 | Kumar et al. |
| 2005/0121005 A1 | 6/2005 | Edwards |
| 2005/0121971 A1 | 6/2005 | Ring |
| 2005/0171655 A1 | 8/2005 | Flynn et al. |
| 2005/0171657 A1 | 8/2005 | Kumar |
| 2005/0186325 A1 | 8/2005 | Luangthep |
| 2005/0188745 A1 | 9/2005 | Staphanos et al. |
| 2005/0189815 A1 | 9/2005 | Bryant |
| 2005/0189886 A1 | 9/2005 | Donnelly et al. |
| 2005/0192720 A1 | 9/2005 | Christie et al. |
| 2005/0196737 A1 | 9/2005 | Mann |
| 2005/0205719 A1 | 9/2005 | Hendrickson et al. |
| 2005/0210304 A1 | 9/2005 | Hartung et al. |
| 2005/0229604 A1 | 10/2005 | Chen |
| 2005/0251299 A1 | 11/2005 | Donnelly et al. |
| 2005/0253397 A1 | 11/2005 | Kumar et al. |
| 2005/0285552 A1 | 12/2005 | Grubba et al. |
| 2005/0288832 A1 | 12/2005 | Smith et al. |
| 2006/0005736 A1 | 1/2006 | Kumar |
| 2006/0017911 A1 | 1/2006 | Villar et al. |
| 2006/0025903 A1 | 2/2006 | Kumar |
| 2006/0030978 A1 | 2/2006 | Rajaram |
| 2006/0047379 A1 | 3/2006 | Schullian et al. |
| 2006/0055175 A1 | 3/2006 | Grinblat |
| 2006/0060345 A1 | 3/2006 | Flik et al. |
| 2006/0076461 A1 | 4/2006 | DeRose et al. |
| 2006/0085103 A1 | 4/2006 | Smith, Jr. et al. |
| 2006/0085363 A1 | 4/2006 | Cheng et al. |
| 2006/0086546 A1 | 4/2006 | Hu et al. |
| 2006/0098843 A1 | 5/2006 | Chew |
| 2006/0116789 A1 | 6/2006 | Subramanian et al. |
| 2006/0116795 A1 | 6/2006 | Abe et al. |
| 2006/0122737 A1 | 6/2006 | Tani et al. |
| 2006/0129289 A1 | 6/2006 | Kumar et al. |
| 2006/0138285 A1 | 6/2006 | Oleski et al. |
| 2006/0162973 A1 | 7/2006 | Harris et al. |
| 2006/0178800 A1 | 8/2006 | Chen et al. |
| 2006/0187086 A1 | 8/2006 | Quintos |
| 2006/0212188 A1 | 9/2006 | Kickbusch et al. |
| 2006/0212189 A1 | 9/2006 | Kickbusch et al. |
| 2006/0219214 A1 | 10/2006 | Okude et al. |
| 2006/0225710 A1 | 10/2006 | Taglialatela-Scafati et al. |
| 2006/0231066 A1 | 10/2006 | Demura et al. |
| 2006/0235584 A1 | 10/2006 | Fregene et al. |
| 2006/0235604 A1 | 10/2006 | Taglialatela-Scafati et al. |
| 2006/0253233 A1 | 11/2006 | Metzger |
| 2006/0271291 A1 | 11/2006 | Meyer |
| 2006/0277906 A1 | 12/2006 | Burk et al. |
| 2006/0282199 A1 | 12/2006 | Daum et al. |
| 2007/0006831 A1 | 1/2007 | Leone et al. |
| 2007/0061053 A1 | 3/2007 | Zeitzew |
| 2007/0062476 A1 | 3/2007 | Ota et al. |
| 2007/0073466 A1 | 3/2007 | Tamai et al. |

(56) References Cited

U.S. PATENT DOCUMENTS

| | | |
|---|---|---|
| 2007/0078026 A1 | 4/2007 | Holt et al. |
| 2007/0093148 A1 | 4/2007 | Gibbs et al. |
| 2007/0108308 A1 | 5/2007 | Keightley |
| 2007/0112475 A1 | 5/2007 | Koebler et al. |
| 2007/0129852 A1 | 6/2007 | Chen et al. |
| 2007/0132463 A1 | 6/2007 | Anderson |
| 2007/0135988 A1 | 6/2007 | Kidston et al. |
| 2007/0137514 A1 | 6/2007 | Kumar et al. |
| 2007/0163352 A1 | 7/2007 | Nielsen et al. |
| 2007/0183039 A1 | 8/2007 | Irvin |
| 2007/0203203 A1 | 8/2007 | Tao et al. |
| 2007/0209619 A1 | 9/2007 | Leone |
| 2008/0183490 A1* | 7/2008 | Martin ............... B61L 27/0027 705/1.1 |
| 2008/0312775 A1 | 12/2008 | Kumar |
| 2009/0198391 A1 | 8/2009 | Kumar et al. |
| 2010/0131130 A1 | 5/2010 | Kalyanam et al. |
| 2010/0235022 A1 | 9/2010 | Siddappa et al. |
| 2010/0262321 A1 | 10/2010 | Daum et al. |
| 2010/0332058 A1 | 12/2010 | Kane et al. |
| 2011/0029243 A1 | 2/2011 | Gallagher et al. |
| 2011/0093144 A1 | 4/2011 | Goodermuth et al. |
| 2011/0118914 A1 | 5/2011 | Brooks et al. |
| 2012/0277940 A1* | 11/2012 | Kumar ............... B61L 27/0027 701/20 |

FOREIGN PATENT DOCUMENTS

| | | |
|---|---|---|
| EP | 19920118189 | 5/1993 |
| JP | H05238392 A | 9/1993 |
| RU | 2273567 C1 | 4/2006 |
| RU | 83221 U1 | 5/2009 |
| SU | 568241 A1 | 12/1981 |
| WO | 20061333306 A1 | 12/2006 |

\* cited by examiner

SYSTEM AND METHOD FOR VEHICLE OPERATION

BACKGROUND

A vehicle system may include one or more powered vehicles that may be mechanically linked (directly or indirectly) to non-powered vehicles. The powered and non-powered vehicles of the vehicle system may travel as a group along a designated route. In cases where the vehicle system includes multiple powered vehicles, the vehicle system may coordinate operations of the powered vehicles to move the vehicle system. For example, a rail vehicle system may include a powered unit consist that has one or more powered units mechanically coupled to one or more non-powered rail cars. Vehicles in a consist may include a lead powered unit and one or more remote powered units and/or trail powered units. (Remote powered units are those that are spaced apart from the lead powered unit by one or more non-powered vehicles. Trail powered units are those that are in the same powered unit consist as the lead powered unit, and thereby not spaced apart from the lead powered unit by one or more non-powered rail vehicles, but that are subordinate to control by the lead powered unit.) The lead vehicle may control operation of one or more remote vehicles.

Various control actions for all or a portion of a mission or trip may be planned in advance. The control actions may be planned in advance using expected values of parameters, for example values expected based on train makeup and/or locomotive type. However, factors beyond the control and/or knowledge of a planner may result in characteristics of the vehicle system, such as mass, horsepower, or braking capability, among others, being different than the expected values. The difference between the expected and actual values may cause a calculated plan to be inaccurate and/or inefficient due to being calculated using incorrect values. Such inaccuracy may cause customer dissatisfaction and potential losses in fuel savings.

BRIEF DESCRIPTION

In one embodiment, a system includes an energy management processing unit. The energy management processing unit is configured to be disposed onboard a vehicle system, and includes a trip planning module, a plurality of estimator modules, and an arbiter module. As used herein, the terms "system," "unit," and "module" may include circuitry, including a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit or system may include a hard-wired device that performs operations based on hard-wired logic of the device. The modules, units, or systems shown in the attached figures may represent the hardware that operates based on software or hardwired instructions, the software that directs hardware to perform the operations, or a combination thereof.

The trip planning module is configured to plan a trip profile specifying power settings for performing a mission based on trip data including a plurality of parameters having expected values. The estimator modules are configured to estimate an experienced value of at least one parameter of the plurality of parameters used by the trip planning module to plan the trip profile; to determine a difference between the experienced value of the at least one parameter and the expected value of the at least one parameter; and to generate an estimation re-plan request of the trip profile when the difference exceeds a threshold. The arbiter module is configured to receive at least one estimation re-plan request from the plurality of estimator modules; to determine whether a re-plan is to be performed pursuant to the at least one estimation re-plan request based on at least one of a state of the vehicle system or an additional estimation re-plan request; and to provide an arbitrated re-plan request to the trip planning module for re-planning the trip profile when the determination is made that the re-plan is to be performed.

In another embodiment, a method is provided. The method includes obtaining, with one or more processors, an estimation re-plan request, the estimation re-plan request based on a difference between an expected value and an experienced value of a parameter used to generate a trip profile for a vehicle. The method also includes determining, with the one or more processors, whether a re-plan is to be performed pursuant to the estimation re-plan request based on at least one of a state of the vehicle or additional estimation re-plan requests. Further, the method includes generating an arbitrated re-plan request for re-planning the trip profile when it is determined to perform a re-plan.

In another embodiment, a tangible and non-transitory computer readable medium is provided that includes one or more computer software modules configured to direct one or more processors to obtain an estimation re-plan request, the estimation re-plan request based on a difference between an expected value and an experienced value of a parameter used to generate a trip profile for a vehicle. The one or more computer software modules are also configured to direct the one or more processors to determine whether a re-plan is to be performed pursuant to the estimation re-plan request based on at least one of a state of the vehicle or additional estimation re-plan requests. The one or more computer software modules configured to direct one or more processors to generate an arbitrated re-plan request for re-planning the trip profile when it is determined to perform a re-plan.

BRIEF DESCRIPTION OF THE DRAWINGS

The inventive subject matter will be better understood from reading the following description of non-limiting embodiments, with reference to the attached drawings, wherein below.

DETAILED DESCRIPTION

Figure 1:
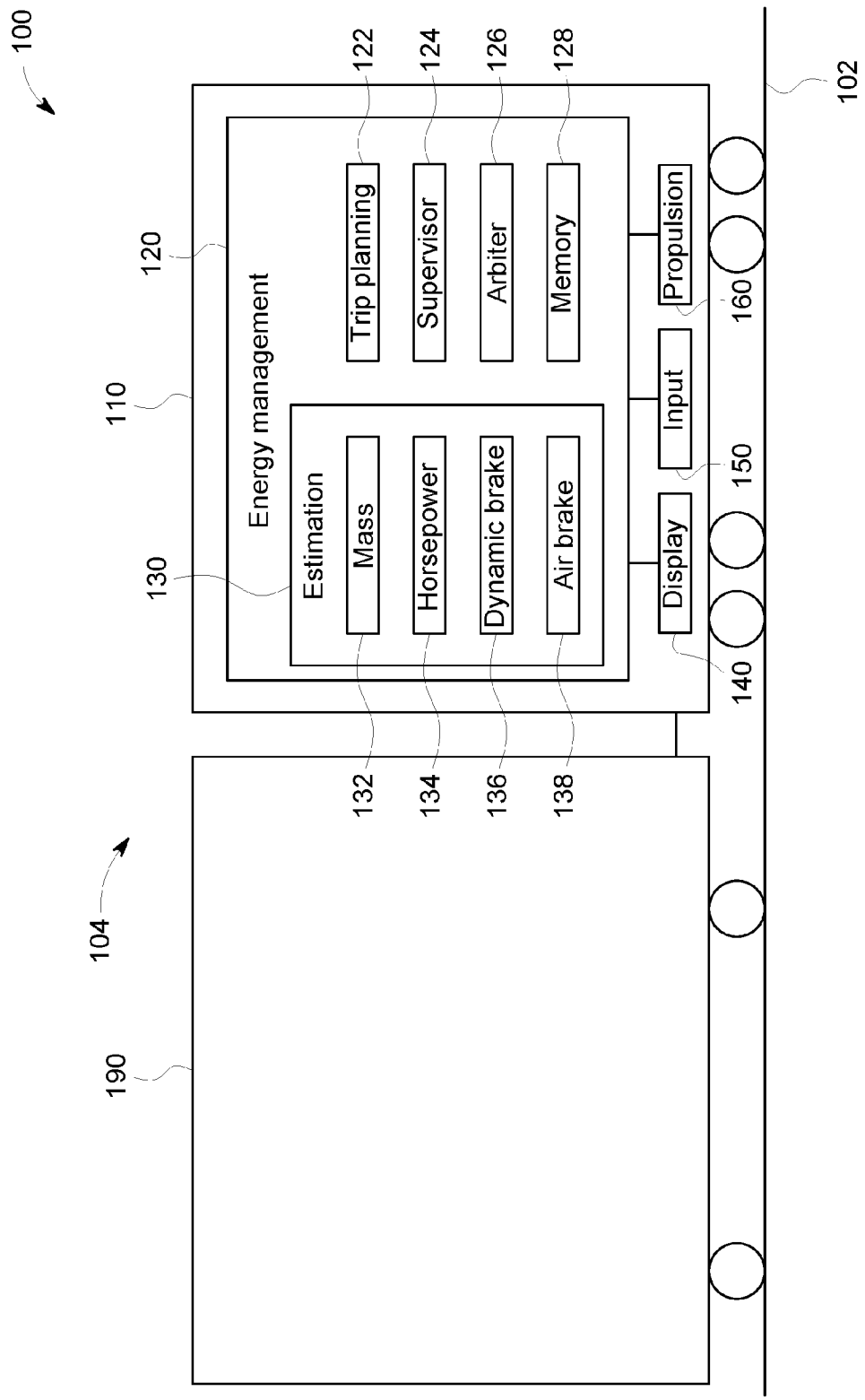
FIG. 1 is a schematic diagram of a transportation system, according to an embodiment of the invention.

As used herein, a vehicle consist may be a group of two or more vehicles that are coupled to travel together along a route. Optionally, a vehicle consist may have a single propulsion-generating unit or vehicle. The vehicles in a vehicle consist can be propulsion-generating units (e.g., vehicles capable of generating propulsive force, which also are referred to as propulsion-generating units, powered units, or powered vehicles) that may be in succession and connected together so as to provide motoring and/or braking capability for the vehicle consist. The propulsion-generating units may be connected together with or without other vehicles or cars between the propulsion-generating units. One example of a vehicle consist is a locomotive consist that includes locomotives as the propulsion-generating units. Other vehicles may be used instead of or in addition to locomotives to form the vehicle consist. A vehicle consist can also include non-propulsion generating units, such as where two or more propulsion-generating units are connected with each other by a non-propulsion-generating unit, such as a rail car, passenger car, or other vehicle that cannot generate propulsive force to propel the vehicle consist. A larger vehicle consist, such as a train, can have sub-consists. Specifically, there can be a lead consist (of propulsion-generating units), and one or more remote consists (of propulsion-generating units), such as midway in a line of cars and another remote consist at the end of the train.

The vehicle consist may have a lead propulsion-generating unit and a trail or remote propulsion-generating unit. The terms "lead," "trail," and "remote" are used to indicate which of the propulsion-generating units control operations of other propulsion-generating units, and which propulsion-generating units are controlled by other propulsion-generating units, regardless of locations within the vehicle consist. For example, a lead propulsion-generating unit can control the operations of the trail or remote propulsion-generating units, even though the lead propulsion-generating unit may or may not be disposed at a front or leading end of the vehicle consist along a direction of travel. A vehicle consist can be configured for distributed power operation, wherein throttle and braking commands are relayed from the lead propulsion-generating unit to the remote propulsion-generating units by a radio link or physical cable. Toward this end, the term vehicle consist should be not be considered a limiting factor when discussing multiple propulsion-generating units within the same vehicle consist.

A vehicle system may include one or more powered vehicles (or powered units) and one or more non-powered vehicles (or non-powered units). In certain embodiments, the vehicle system is a rail vehicle system that includes one or more locomotives and, optionally, one or more rail cars. In other embodiments, however, the vehicle system may include non-rail type vehicles, including off-highway vehicles (e.g., vehicles that are not designed or allowed by law or regulation to travel on public roads, highways, and the like), automobiles, marine vessels, and the like. In some cases, at least a plurality of the vehicles in a vehicle system may each include a separate vehicle network.

One or more examples of the inventive subject matter described herein provide methods and systems for modifying control strategies (e.g., trip plans or trip profiles) for energy management of a consist performing a mission. For example, in various embodiments, physics and/or feedback based calculations are employed to determine the actual or experienced mass, horsepower, dynamic brake capability, and air brake capability present for a vehicle system during a trip or performance of a mission. Physics based calculations may utilize, for example, one or more of a determined force, speed, or acceleration of the vehicle system. Feedback based calculations may utilize information from one or more sensors. The expected values used in generating a trip plan are then compared to the actual or experienced values to determine if the plan was created using correct values (or values within an acceptable range of correct values). An arbiter module may be configured to receive input regarding the comparison of the expected values to the correct or experienced values, and determine which (if any) parameters used in planning may be adjusted for creation of a new or revised plan. Once the arbiter module has determined which estimate re-plans are to be performed, the arbiter module may output all necessary data (e.g., the actual or experienced values and/or modified values based on the actual or experienced values) for performing the re-plan.

Various embodiments provide a logic machine that may be implemented, for example, in a simulation or model based environment. The logic machine (e.g., arbiter module) may receive inputs from estimators (e.g., estimators configured to estimate experienced values for mass, horsepower, dynamic braking capability and air brake capability, among others, experienced during a trip or mission) and determine when to perform a re-plan. In some embodiments, after the arbiter module receives a re-plan request from an estimator, the arbiter module begins a countdown during which the arbiter module waits to see if any other estimators request a re-plan in the same time period. If more than one estimator requests a re-plan during the same time period, the arbiter module may determine which estimator requested re-plan(s) will be performed, and further may determine which estimators may need to perform a subsequent estimation. For example, in one example scenario, a mass estimator (e.g., estimator that estimates an experienced mass) and a dynamic brake estimator (e.g., estimator that estimates an experienced dynamic brake capability) each request a re-plan during a common time period. The arbiter module may select the mass estimator requested re-plan for performance, and not the dynamic brake estimator requested re-plan, because the dynamic brake information may be based on the expected mass and thus considered not reliable (as the expected mass is indicated as incorrect by the mass estimator). The experienced mass determined by the mass estimator may be provided to the dynamic brake estimator, and used by the dynamic brake estimator to generate a subsequent estimate of dynamic brake capability. Further, the arbiter module may take the state or condition of a vehicle system into consideration when determining if a requested re-plan is to be performed. Further still, the arbiter module may consider information from a supervisor subsystem or other subsystem of a vehicle system when determining if a requested re-plan is to be performed. Certain types of re-plans may only be performed when a vehicle system is in a particular state (or when a vehicle system is not in a particular state). For example, if an air brake system is currently being applied, a re-plan based on a request from an air brake estimator may not be performed.

At least one technical effect of various examples of the inventive subject matter described herein may include improved accuracy in re-planning a trip. At least one technical effect of various examples of the inventive subject matter described herein may include improved efficiency in vehicle operation. Another technical effect may include improved fuel savings. Another technical effect may include improved customer satisfaction. Another technical effect may include reduction of abrupt or overly frequent throttle setting changes.

FIG. 1 illustrates a schematic block diagram of a transportation system 100 formed according to one example of the present inventive subject matter. The transportation system 100 depicted in FIG. 1 includes a consist 104 that is configured to traverse a route 102, for example to perform a mission. All or a portion of the consist 104 may be scheduled to arrive at one or more destinations along the route 102 pursuant to the mission. In the illustrated example, the consist 104 includes a powered vehicle 110 and a cargo (or non-propulsion-generating) unit 190. It may be noted that additional propulsion-generating vehicles and/or non-propulsion-generating units (e.g., powered vehicles, cargo vehicles, fuel cars or tenders) may be included in the consist 104 in various embodiments. Thus, while one propulsion-generating vehicle and cargo unit are shown in FIG. 1, it should be understood that the consist 104 may include additional vehicles or cars. Further, the energy management processing unit as discussed herein may be configured to develop and/or modify trip plans configured for the operation of plural propulsion-generating vehicles (e.g., lead and remote propulsion-generating vehicles, lead and remote propulsion-generating consists of a consist). It may be noted that, as used herein, powered or un-powered when used to describe a vehicle or unit refers to the ability to generate propulsion, and does not necessarily refer to the ability to receive and/or generate electrical energy or current, for example.

The powered vehicle 110 in the illustrated embodiment is configured as a powered rail vehicle or locomotive, and the route 102 includes one or more railroad tracks. Other types of vehicles or routes may be used in other embodiments. The powered vehicle 110 may include throttle levels set as notches from 0-8. The notches may be adjusted by integer values in some examples (e.g., 0, 1, 2, 3, 4, and so on), or by finer adjustments in other embodiments.

The powered vehicle 110 depicted in FIG. 1 includes an energy management processing unit 120, a display unit 140, an input unit 150, and a propulsion system 160. Generally, the energy management processing unit 120 determines a trip plan or other specification of settings used to control the consist 104 to perform a mission. The depicted energy management processing unit 120 includes a trip planning module 122, a supervisor module 124, an arbiter module 126, a memory 128, and an estimation unit 130 (which includes a plurality of estimator modules). The energy management processing unit 120 may include processing circuitry configured to perform one or more tasks, functions, or steps discussed herein, for example as specified by one or more software modules. For example, the energy management processing unit 120 may generate an initial trip plan based on expected values of a number of parameters, estimate or otherwise determine an actual or experienced value of at least one of the parameters, determine whether to re-plan a trip using the determined actual or experienced value, and, if a re-plan is determined appropriate, re-plan the trip. The depicted display unit 140 is configured to provide a display to a user. For example, the display unit 140 may display a command or setting called for by a trip profile, display an experienced value of a parameter as determined by the estimation unit 130, and/or display information describing a proposed or suggested re-plan. The depicted input unit 150 is configured to obtain an input, such as a user input. For example, a user may request a re-plan, modify an indicated re-plan, or deny performance of a suggested or proposed re-plan. It may be noted that the particular units or modules shown in FIG. 1 are meant by way of example, and that other arrangements of units or sub-units of the processing unit 120 may be employed in various embodiments.

Generally, in various embodiments, the trip planning module 122 is configured to plan a trip profile for use by the consist 104 (e.g., the powered vehicle 110 and/or other powered vehicles of the consist 104). The trip profile may specify power settings for performing a mission based on trip planning data. The trip planning data may include a plurality of parameters having expected values. For example, the trip planning data, which may be provided before commencing a mission or trip, may include expected values for mass of the consist 104, dynamic braking capability of the consist 104, air braking capability of the consist 104, or horsepower of the consist 104, among others. The expected values may be estimated based upon, for example, an identification of the units (e.g., locomotives identified by type of locomotive, cargo units identified by type of unit, type of cargo, and amount of cargo) of units in the consist 104. However, it may be noted that the actual values or values of the parameters experienced and measured during performance of a mission may differ from the estimated values used to develop an initial trip plan (e.g., a trip plan developed before commencing a mission). The estimation unit 130 may request an estimation re-plan if one or more experienced values differs by more than a threshold from one or more corresponding expected values. If the estimation unit 130 requests one or more estimation re-plans, the arbiter module 126 determines which, if any re-plans are to be provided to the trip planning module 122 for implementation.

The trip planning module 122 in the illustrated example is configured to determine or develop a trip plan specifying operational settings to be utilized by the consist 104 (e.g., the powered vehicle 110 and/or any other powered vehicles in the consist) during performance of a mission to achieve one or more desired results.

Generally, the energy management processing unit 120 (e.g., the trip planning module 122) may be configured to operate as a control system disposed on-board the powered vehicle 110. For example, the trip planning module 122 may receive one or more schedules from an off-board scheduling or dispatch system, and generate control signals that may be used to control propulsion of the consist 104 (e.g., the powered vehicle 110) over the route 102. For example, the powered vehicle 110 may include one or more wireless antennas (and associated transceiving equipment), such as RF or cellular antennas, that receive the schedules from the scheduling system. The energy management processing unit 120 may examine the schedule, such as by determining the scheduled destination location and scheduled arrival time, and generate control signals based on the schedule. Optionally, part or all of the energy management processing unit 120 can be disposed off-board the vehicle 110 and/or the consist 104 and communicate the trip plan to the vehicle 110.

The control signals may be used to automatically control tractive efforts and/or braking efforts of the consist 104 (e.g., the powered vehicle 110) such that the consist 104 (e.g., the powered vehicle 110) self-propels along the route 102 to the destination location. For example, the energy management processing unit 120 may be operatively coupled with a propulsion system 160 of the powered vehicle 110. The propulsion system 160 may include motors (such as traction motors), engines, brakes (such as air brakes and/or regenerative brakes), and the like, that generate tractive energy to propel the powered vehicle 110 and/or slow movement of the powered vehicle 110. The energy management processing unit 120 may generate control signals that automatically control the propulsion system 160, such as by automatically changing throttle settings and/or brake settings of the propulsion system 160. (As used herein, self-propulsion includes automatic operation under the purview of an operator, who may have the option to take over manual control of the vehicle.)

In another example aspect, the control signals may be used to prompt an operator of the powered vehicle 110 to manually control the tractive efforts and/or braking efforts of the powered vehicle 110. For example, the energy management processing unit 120 may include or be operably coupled to an output device, such as a computer monitor, touchscreen, acoustic speaker, or the like, that generates visual and/or audible instructions based on the control signals. In the depicted example, the display unit 140 may be employed as the output device. The instructions may direct the operator to manually change throttle settings and/or brake settings of the propulsion system 160.

The trip planning module 122 may form a trip profile for a trip of the consist 104 to travel to a scheduled destination location at a scheduled arrival time (or within a designated time period of the scheduled arrival time). The trip profile may be formed by the energy management processing unit 120 (e.g., the trip planning module 122 of the energy management module 120) to reduce one or more of fuel, emission, or time of a mission relative to traveling according to another trip profile. The trip profile may include throttle settings, brake settings, designated speeds, or the like, of the powered vehicle 110 for various sections of the trip of the powered vehicle 110. The trip profile can designate one or more of these operational settings as a function of time and/or distance along the route for the trip. For example, the trip profile may include one or more velocity curves that designate various speeds of the powered vehicle 110 along various sections of the route 102.

The trip profile may be formed based on information related to the consist 104, the route 102 over which the consist 104 will traverse during the upcoming trip, and/or other information. The information related to the consist 104 can include the type of powered vehicle 110, the tractive energy generated by the powered vehicle 110 (and any other powered vehicles in the consist 104), the weight or mass of the powered vehicle 110, the cargo unit 190, any other powered vehicles or fuel cars, and/or cargo being carried by the consist 104, the length and/or other size of the consist 104 (e.g., how many powered and non-powered units are mechanically coupled with each other in the consist 104), the horsepower generated by the powered vehicle 110 (and any other powered vehicles in the consist 104), a braking capability of the powered vehicle 110 and/or the consist 104 (e.g., dynamic braking capability, air braking capability), locations or distributions of the propulsion-generating vehicles in the consist 104, and the like.

The information related to the vehicle may be based on expected values. For example, an expected mass value may be based on the number and type of powered units as well as the number and type of cargo units (including mass of cargo). However, the expected values may deviate from the values actually experienced during the mission. The information related to the route 102 may include the curvature, grade (e.g., inclination), existence of ongoing repairs, speed limits, and the like, for one or more sections of the route 102. The other information may include information regarding the cost of each type of fuel used by the consist 104, information related to conditions that impact how much fuel (e.g., how much of each type of fuel available for use) is used while traveling, such as the air pressure, temperature, humidity, and the like, information related to emission produced at the various throttle settings employed during a mission, and the like.

The energy management processing unit 120 may form the control signals based on a trip plan. It may be noted that, while a single powered vehicle 110 is shown in the example of FIG. 1, the energy management processing unit 120 may also be configured to control additional vehicles of a consist and/or provide a trip plan including settings for additional powered vehicles in a consist (e.g., when the powered vehicle 110 is utilized as a lead vehicle of a consist). The trip profile may be determined using a system such as the Trip Optimizer™ system of the General Electric Company, or another energy management system.

The trip profile may be based on trip planning data, including the various data discussed above. The trip planning data used to form the trip profile may include trip data, train data, track data, and/or an update to trip data, train data, or track data. Train data includes information about the rail vehicle and/or cargo being carried by the rail vehicle. For example, train data may represent cargo content (such as information representative of cargo being transported by the rail vehicle) and/or rail vehicle information (such as model numbers, manufacturers, horsepower, and the like, of locomotives and/or other railcars in the rail vehicle). Trip data includes information about an upcoming trip by the rail vehicle. By way of example only, trip data may include station information (such as the location of a beginning station where the upcoming trip is to begin and/or the location of an ending station where the upcoming trip is to end), restriction information (such as work zone identifications, or information on locations where the track is being repaired or is near another track being repaired and corresponding speed/throttle limitations on the rail vehicle), and/or operating mode information (such as speed/throttle limitations on the rail vehicle in various locations, slow orders, and the like). Track data includes information about the track or rails upon which the rail vehicle travels. For example, the track data may include information about locations of damaged sections of a track, locations of track sections that are under repair or construction, the curvature and/or grade of a track, GPS coordinates of the track, and the like. The track data is related to operations of the rail vehicle as the track data includes information about the track that the rail vehicle is or will be traveling on. However, other types of data can be recorded as the data and/or the data may be used for other operations. The term "trip planning data" may refer to trip data, train data, and track data, only one of trip data, train data, or track data, or another type of data.

The depicted estimation unit 130 includes a plurality of estimator modules. The estimator modules are configured to estimate one or more experienced values of one or more parameters used by the trip planning module 122. As used herein, an experienced value may be understood as a value determined during performance of a mission, using either information from a sensor or detector and/or information derived from a calculation based on other measured or detected parameters during performance of a mission. The estimator modules can be further configured to compare the experienced value of the at least one parameter to a corresponding expected value (or previously determined experienced value) used to generate a current trip plan to determine a difference between the experienced value and the expected or currently used value. An estimation re-plan request of the trip profile can be generated responsive to this difference exceeding a threshold, such as a designated, non-zero threshold. As used herein, an estimation re-plan is a modification to a currently implemented trip plan that corresponds to a difference between an expected and experienced value of a parameter used in trip planning. In contrast, other types of re-plans include a recoverability re-plan that is undertaken, for example, after manual control of a vehicle deviates from a trip plan, or as another example, to a configuration re-plan that may be performed after units are added to and/or removed from the consist 104.

For example, an initial trip plan may be formed before a mission is performed (or during an earlier portion of the mission). The initial trip plan may be developed based on an expected mass (or an experienced mass from the earlier portion of the mission). The expected mass may be estimated based on a number of cargo units and an average expected mass for each cargo unit. However, during performance of the mission, an experienced mass may be determined, for example using a calculation based on the speed and acceleration of the vehicle during performance of the mission. The experienced mass may differ from the expected mass, for example, if the cargo units are under- or overloaded, or, as another example, the experienced mass may appear different under the influence of a relatively constant and sufficient head wind or tail wind. If the expected and experienced mass are relatively close (e.g., the difference is less than a predetermined threshold), no estimation re-plan may be requested. However, if the expected and experienced mass are not relatively close (e.g., the difference is greater than a predetermined threshold), an estimation re-plan may be requested (e.g., an estimation re-plan request may be provided to the arbiter module 126 of the processing unit 120) by the estimation unit 130. The threshold may be selected in various embodiments to avoid the computational and/or implementational considerations required for a re-plan for a relatively small difference, while allowing a re-plan to be performed for a relatively large difference.

As another example, an expected horsepower for the powered vehicle 110 may be estimated based on ideal, standard, or expected conditions of temperature and pressure. However, the temperature and pressure encountered during a mission may differ from the ideal, standard, or expected conditions. As another example, a motor, engine, or other mechanical aspect may malfunction, reducing horsepower from an expected value. Accordingly, the horsepower produced or experienced by the consist 104 (e.g., by the powered vehicle 110 and/or other powered vehicles) during performance of a mission may differ from the expected value. If the expected and experienced horsepower are not relatively close (e.g., the difference is greater than a predetermined threshold), an estimation re-plan may be requested (e.g., a re-plan request may be provided to the arbiter module 126 of the processing unit 120), while, if the expected and experienced horsepower are relatively close (e.g., the difference is less than a predetermined threshold) an estimation re-plan may not be requested by the estimation unit 130. In the illustrated embodiment, the estimation unit 130 includes a mass estimator module 132, a horsepower estimator module 134, a dynamic brake (DB) estimator module 136, and an air brake estimator module 138. It may be noted that the particular units or modules of the estimation unit 130 shown in FIG. 1 are meant by way of example, and that other arrangements of units or sub-units of the estimation unit 130 may be employed in various embodiments. For example, additional or alternative estimator units (e.g., estimator units configured to estimate experienced values for one or more additional or alternative parameters to those discussed in connection with FIG. 1) may be utilized in various embodiments.

The mass estimator module 132 is configured to estimate an experienced or actual value of mass (e.g., total mass of the consist 104) experienced during performance of a mission or trip. For example, the mass estimator module 132 may obtain information regarding speed, acceleration, and/or tractive force and determine the mass of the consist 104 during performance of a mission using a physics based calculation. After estimating the actual or experienced mass, the mass estimator module 132 may determine if an estimation re-plan request is appropriate. For example, the mass estimator module 132 may obtain a currently used value of mass (e.g., an expected value of mass or an experienced value of mass from previous in the trip used to plan the currently implemented trip profile) from the trip planning module 122, and compare the currently used value to the experienced value. If the values are within a predetermined threshold (e.g., are relatively close), no estimation re-plan request may be made. However, if the values differ by more than the predetermined threshold, the mass estimator module 132 provides an estimation re-plan request to the arbiter module 126. The estimation re-plan request may specify one or more of an indication that an estimation re-plan request is being requested, an identification of the type of estimation re-plan request (e.g., a mass estimation re-plan request), and a value to be used pursuant to the requested estimation re-plan (e.g., a proposed or suggested value of mass for the consist 104 to be used for re-planning or modifying a trip profile, for example a value of mass set to the actual or experienced valued determined or estimated by the mass estimator module 132).

The horsepower estimator module 134 is configured to estimate an experienced or actual value of horsepower experienced (e.g., actual horsepower produced by the powered vehicle 110 and/or other powered vehicles of the consist 104) during performance of a mission or trip. For example, the horsepower estimator module 134 may obtain information from one or more sensors, for example sensors detecting torque, rotational speed, or the like of an output of one more powered vehicles, and determine horsepower during performance of a mission. The actual horsepower produced may differ from an expected value to changes in environmental conditions (e.g., temperature or pressure) or malfunction of one more engines or components thereof, for example. It may be noted that the horsepower estimator module 134 may only perform an estimation at certain times or when the consist 104 is in particular states. For example, the horsepower estimator module 134 may perform an estimate of experienced horsepower only at one or more throttle settings, such as relatively high throttle settings. Relatively high throttle settings may provide more consistent or reliable estimates of horsepower than estimates performed at relatively low throttle settings. In some embodiments, throttle settings may vary from 0-8, with the horsepower estimator module 134 only estimating horsepower when the notch settings are at 7 or above. After estimating the actual or experienced horsepower, the horsepower estimator module 134 may determine if an estimation re-plan request is appropriate. For example, the horsepower estimator module 134 may obtain a currently used value for horsepower (e.g., an expected value of horsepower based on predetermined ratings of powered vehicles in a consist) or an experienced value of horsepower from previous in the trip used to plan the currently implemented trip profile) from the trip planning module 122, and compare the currently used value to the experienced value. If the values are within a predetermined threshold (e.g., are relatively close), no estimation re-plan request may be made. However, if the values differ by more than the predetermined threshold, the horsepower estimator module 134 provides an estimation re-plan request to the arbiter module 126. The estimation re-plan request may specify one or more of an indication that an estimation re-plan request is being requested, an identification of the type of estimation re-plan request (e.g., a horsepower estimation re-plan request), and a value to be used pursuant to the requested estimation re-plan (e.g., a proposed or suggested value of horsepower to be used in re-planning, for example a value of horsepower set to the actual or experienced valued determined or estimated by the horsepower estimator module 134).

The DB estimator module 136 is configured to estimate an experienced or actual value of dynamic braking capability experienced during performance of a mission or trip. The dynamic braking capability may be expressed, for example, in terms of an available braking force or a required distance (or distances) for braking from a given speed (or speeds). For example, the DB estimator module 136 may obtain information regarding speed, acceleration, and/or braking force provided by a dynamic braking system and determine the dynamic braking capability of the consist 104 during performance of a mission using a physics based calculation. The particular relationships used to calculate estimated values may vary or be tailored by application. The relationships may be expressed as part of a mathematical formula and/or in look-up tables. It may be noted that the DB estimator module 136 may only perform an estimation at certain times or when the consist 104 is in particular states. For example, the DB estimator module 136 may estimate DB braking capability only when a dynamic braking activity is taking place. After estimating the actual or experienced dynamic braking capability, the DB estimator module 136 may determine if an estimation re-plan request is appropriate. For example, the DB estimator module 136 may obtain a currently used value for dynamic braking capability (e.g., an expected value or an experienced value from previous in the trip used to plan the currently implemented trip profile) from the trip planning module 122, and compare the currently used value to the experienced value. If the values are within a predetermined threshold (e.g., are relatively close), no estimation re-plan request may be made. However, if the values differ by more than the predetermined threshold, the DB estimator module 136 provides an estimation re-plan request to the arbiter module 126. The estimation re-plan request may specify one or more of an indication that an estimation re-plan request is being requested, an identification of the type of estimation re-plan request (e.g., a DB estimation re-plan request), and a value to be used pursuant to the requested estimation re-plan (e.g., a proposed or suggested value of dynamic braking capability, for example a value of dynamic braking capability set to the actual or experienced valued determined or estimated by the DB estimator module 136).

The air brake estimator module 138 is configured to estimate an experienced or actual value of air braking capability experienced during performance of a mission or trip. The air braking capability may be expressed, for example, in terms of an available braking force or a required distance (or distances) for braking from a given speed (or speeds). For example, the air brake estimator module 138 may obtain information regarding speed, acceleration, and/or braking force provided by an air braking system and determine the air braking capability of the consist 104 during performance of a mission using a physics based calculation. The particular relationships used to calculate estimated values may vary or be tailored by application. The relationships may be expressed as part of a mathematical formula and/or in look-up tables. It may be noted that the air brake estimator module 138 may only perform an estimation at certain times or when the consist 104 is in particular states. For example, the air brake estimator module 138 may estimate air braking capability only when an air braking activity is taking place. After estimating the actual or experienced air braking capability, the air brake estimator module 138 may determine if an estimation re-plan request is appropriate. For example, the air brake estimator module 138 may obtain a currently used value for air braking capability (e.g., an expected value or an experienced value from previous in the trip used to plan the currently implemented trip profile) from the trip planning module 122, and compare the currently used value to the experienced value. If the values are within a predetermined threshold (e.g., are relatively close), no estimation re-plan request may be made. However, if the values differ by more than the predetermined threshold, the air brake estimator module 138 provides an estimation re-plan request to the arbiter module 126. The estimation re-plan request may specify one or more of an indication that an estimation re-plan request is being requested, an identification of the type of estimation re-plan request (e.g., an air brake estimation re-plan request), and a value to be used pursuant to the requested estimation re-plan (e.g., a proposed or suggested value of air braking capability, for example a value of air braking capability set to the actual or experienced valued determined or estimated by the air brake estimator module 138).

The arbiter module 126 is configured to receive estimation re-plan requests from the plurality of estimator modules, and to determine if a re-plan is to be performed pursuant to any estimation re-plan requests received. For example, the arbiter module 126 may determine if an estimation re-plan is to be performed based on a state of the consist 104 (e.g., if the consist 104 is traveling above a predetermined speed, if the throttle of powered vehicles in the consist is above a predetermined threshold, or if air brakes are being applied, for example). Additionally or alternatively, the arbiter module 126 may determine whether an estimation re-plan is to be performed based on additional estimation re-plan requests. For example, the various estimator modules may be ranked in a priority, with requests from lower priority modules passed over in favor of requests from higher priority modules. The arbiter module 126 is also configured to provide an arbitrated re-plan request to the trip planning module 122 for re-planning the trip profile when it is determined that a re-plan is to be performed. An arbitrated re-plan request for example may include the re-plan request that was selected from a group of re-plan requests, for example a re-plan request selected based on a priority ranking.

Additionally or alternatively, an arbitrated re-plan request may include a re-plan request that has been modified or adjusted from an estimation re-plan request generated by one or more of the estimator modules. For example, an estimation re-plan request may specify a relatively large change in a parameter that may result in a relatively large change in settings such as throttle once a re-plan using the new parameter value is implemented; however, the arbitrated re-plan request may adjust for a smaller change in the parameter to provide a smaller change in settings resulting from a re-plan to provide smoother operation. For example, at relatively high throttle settings, a value suggested by an estimator module may be modified to provide a smaller amount of change from a value used for a current trip profile, so that any changes in operation (e.g., throttle setting) called for by a re-planned trip profile will not be overly abrupt. After an arbitrated value provided by the arbiter module 126 is implemented by the trip planning module 122, the "expected value" may be re-set to the arbitrated value used to modify the trip plan. If the smaller adjustment specified by the arbiter module 126 is not sufficient to bring the expected value (e.g., the value used in generating or modifying the trip plan) within the threshold of the experienced value, subsequent estimation re-plans may be performed to smoothly and gradually bring the expected and experienced values in line.

As indicated herein, in various embodiments, the arbiter module 126 is configured to select among a plurality of estimation re-plan requests based on a predetermined priority ranking. The plurality of estimation re-plan requests may be received with a predetermined time period. For example, the arbiter module 126 may check for estimation re-plan requests accrued at regular time intervals (e.g., every minute, every two minutes, every five minutes, or every ten minutes, among others). As another example, after receiving an estimation re-plan request from a given estimator module, the arbiter module 126 may initiate a countdown or timing period to see if any additional requests are received from other estimator modules within a given time period (e.g., within one minute after a first request, within two minutes after a first request, with five minutes after a first request, or with ten minutes after a first request, among others). When more than one estimation re-plan request is received, a request (or requests) having a higher priority may be selected preferentially over a request (or requests) having a lower priority.

For example, the priority may be based upon whether a given re-plan request from a given estimator module has one or more parameters that are dependent upon one or more parameters provided by a different estimator module. For example, a DB or air brake capability estimation may use a mass (from the trip planning module 122 and/or mass estimator module 132) as an input. Thus, the DB or air brake capability estimation may be dependent on the mass estimation. However, if the mass estimator module 132 indicates the mass estimate may need adjustment, the reliability of a DB or air brake estimation request based upon a mass estimate identified as being at issue may be questioned. Accordingly, the mass estimate re-plan request may be given priority over the DB or air brake estimate request (where the DB or air brake estimates include parameters that depend upon the mass estimate), so that a re-plan may be performed to correct the mass, with the corrected mass then used for subsequent evaluation (e.g., by the estimation unit 130) regarding whether a DB or air brake capability re-plan is appropriate in light of the revised mass value. It may be noted that, in some embodiments, some estimation re-plan requests may be ordered in a dependency-based hierarchy or priority, while others may not. For example, horsepower estimation may be independent or unrelated to air brake capability estimation, and, accordingly, horsepower estimation and air brake capability estimation may not be ordered with respect to each other as part of dependency based priority, while other estimation requests may be (e.g., a mass estimation re-plan request may be given priority over an air brake estimation re-plan request).

Additionally or alternatively, the arbiter module 126 may select re-plan requests based on reliability of re-plan requests. For example, the arbiter module 126, when receiving a first and second estimation re-plan requests within a given time period, may select the first re-plan request over the second re-plan request when the first re-plan request is determined to be more reliable than the second re-plan request. In some embodiments, re-plan requests that are based upon (or more heavily based upon) feedback or direct information from sensors may be deemed more reliable than re-plan requests that are based upon (or more heavily based upon) physics based calculations to provide estimates. For example, in some embodiments, estimates of mass and/or braking capabilities may be generated using physics based models of train motion, while horsepower estimates may be generated using sensors and/or feedback, with horsepower estimates thus measured more directly than mass and/or braking capability estimates. Accordingly, horsepower estimates may be deemed more reliable than estimates of mass and/or braking capability and assigned a higher priority in various embodiments.

As indicated herein, estimation re-plan requests received by the arbiter module 126 may include a specification of a new value of an estimated parameter from an estimator module. However, it may be noted that the arbiter module 126 may modify or adjust the specified value of the parameter before providing the trip planning module 122 with a request (either directly to the trip planning module 122, or indirectly via the supervisor module 124) for an estimation re-plan. Thus, the arbiter module 126 may be configured to adjust a value of an estimation re-plan request received from the estimation unit 130 (e.g., one of the estimator modules of the estimation unit 130) to provide a corresponding modified value for an arbitrated re-plan request provided to the trip planning module 122. An arbitrated re-plan request accordingly may include an estimation request that has been selected or approved by the arbiter module 126 as well as one or more values of parameters to be used by the trip planning module 122 in performing the re-plan.

For example, the arbiter module 126 may adjust the value of one or more parameters of an estimation re-plan request originally provided by an estimator module based on a state of the vehicle. In one example, the consist 104 may be traveling at a relatively high rate of speed or at a relatively high throttle setting. If a parameter used for trip planning is changed by a relatively large amount, the trip plan may specify a relatively large change in operating parameters, such as throttle setting. If such a large change is implemented while operating a high throttle setting, the consist 104 may be subject to an abrupt change in speed. To avoid such abrupt changes in speed, the arbiter module 126 may modify one or more parameters specified by an estimation re-plan request to provide a smaller change from a current value, helping to maintain smooth or consistent operation of the consist 104 when at a high speed or throttle setting. For example, if the mass estimator module 132 request a re-plan using a value of mass that differs about 50% from a currently used value, the resulting trip profile may cause an abrupt change in throttle when operating at a high throttle setting. The arbiter module 126 may limit the amount of change in mass estimate, for example, to about 10% when operating at a high throttle setting (e.g., 7 or 8). It may be noted that the amount of change permitted at lower throttle settings may be larger.

It may further be noted that the arbiter module 126 may deny certain types of re-plan requests based on the state of the consist 104. For example, an air brake estimation request may not be permitted when the air brakes are applied. As another example, the arbiter module 126 may receive information from another system, sub-system, unit, or module (e.g., supervisor module 124), and the arbiter module 126 may deny an estimation re-plan request based on the received information. For example, the supervisor module 124 may determine that a recoverability re-plan is being performed, and inform the arbiter module 126, with the arbiter module 126 denying estimation re-plan requests received during performance of a recoverability re-plan. In other embodiments, the arbiter module 126 may provide an arbitrated re-plan request to the supervisor module 124, and the supervisor module 124 may determine whether to forward the arbitrated re-plan request from the arbiter module 126 to the trip planning module 122.

The depicted supervisor module 124 is configured to receive an arbitrated re-plan request from the arbiter module 126, and to determine whether to forward the arbitrated re-plan request to the trip planning module 122. For example, the supervisor module 124 may determine whether to forward the arbitrated re-plan request based on a planning state of the consist 104. A planning state of a vehicle or vehicle system may specify whether a trip planner is actively planning or re-planning a trip profile, and may specify the type of re-plan being performed (e.g., estimation re-plan or recoverability re-plan, among others). In various embodiments, the supervisor module 124 may deny an arbitrated re-plan request (and/or instruct the arbiter module 126 to deny estimation re-plan requests from the estimation unit 130) during performance of a recoverability re-plan, or, as another example, during a re-plan performed responsive to adding and/or removing units from the consist 104.

Figure 2:
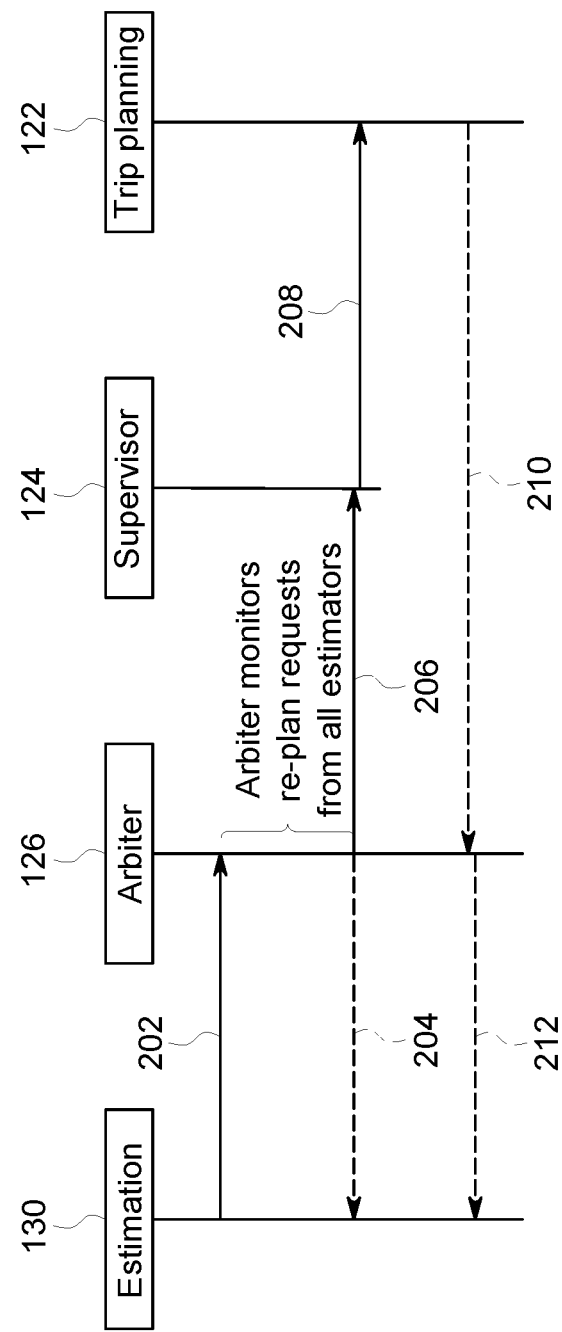
FIG. 2 illustrates various messages and/or requests that may be transmitted between aspects of an energy management processing unit, according to an embodiment of the invention.

FIG. 2 illustrates various messages and/or requests that may be transmitted between aspects of the energy management processing unit 120. In the illustrated embodiment, the estimation unit 130 has determined that at least one value used to generate a current trip plan (e.g., an expected value or a previously estimated experienced value) differs from a determined experienced value by more than a threshold amount. The estimation unit 130 thus generates an estimation re-plan request 202 that is transmitted to the arbiter module 126. The estimation re-plan request 202 may identify the type of estimation re-plan being requested (e.g., mass, horsepower, dynamic brake capability, or air brake capability, among others) as well as one or more parameters or scale factors associated with the request, for example an experienced value of at least one variable determined by the estimation unit (e.g., an experienced mass based on a physics based calculation based on vehicle motion).

The arbiter module 126 receives and evaluates the estimation re-plan request 202. For example, the arbiter module 126 may select among two or more received requests, or determine whether to forward a re-plan request to the trip planning module 122 based on a state of the consist 104 as discussed herein. If the arbiter module 126 denies the estimation re-plan request, the arbiter module 126 may transmit a re-evaluate direction 204 to the estimation unit 130. The estimation re-plan request 202 may be denied, for example, because a different received re-plan request was given a higher priority, or, as another example, because the consist 104 was in a state inappropriate for performing the requested re-plan. The re-evaluation direction 204 may direct the estimation unit 130 to re-perform or re-evaluate an estimate previously resulting in the denied estimation re-plan request, for example at a given time in the future and/or after receiving an instruction re-setting one or more parameters used by the estimation unit 130. If the arbiter module 126 grants or selects the estimation re-plan request 202, the arbiter module 126 forwards an arbitrated re-plan request 206 to the supervisor module 124. The arbitrated re-plan request 206 may specify a type of re-plan request (e.g., mass estimation re-plan request), and may also specify one or more parameters or scale factors to be used as part of the re-plan (e.g., an estimate of mass). It may be noted that the value of parameter specified by the arbitrated re-plan request 206 may differ from a value of the original estimation re-plan request 202. For example, the arbiter module 126 may adjust the value to avoid a sudden or abrupt change in operation at a high throttle setting.

The supervisor module 124 receives the arbitrated re-plan request 206 and evaluates whether to forward the arbitrated re-plan request 206 to the trip planning module 122. For example, if the supervisor module 124 determines that the trip planning module 122 is performing a different type of re-plan (e.g., a recoverability re-plan), the supervisor module 124 may deny the arbitrated re-plan request 206. If the supervisor module 124 determines the arbitrated re-plan request 206 is appropriate for implementation, the supervisor module 124 forwards a plan request message 208 corresponding to the arbitrated re-plan request 206 to the trip planning module 122.

The trip planning module 122 receives the plan request message 208. Responsive to receiving the plan request message 208, the trip planning module 122 re-plans the trip profile using at least one parameter that has a value differing from a value used to plan the current or previous trip profile (e.g., a revised mass estimate). After performing the re-plan, the trip planning module 122 transmits a plan data message 210 to the arbiter module 126. The plan data message 210, for example, may indicate values used to perform the re-plan. For example, for a re-plan performed due to a revision of a mass estimate, the plan data message 210 may specify the most recent mass estimate used as part of the re-plan, along with other values used in performing the re-plan (which may be changed or un-changed from a previous plan). In various embodiments, the arbiter module 126 may receive plural plan data messages 210.

Responsive to receiving the plan data message 210, the arbiter module 126 prepares an estimator reset message 212 and forwards the estimator reset message 212 to the estimation unit 130 (e.g., to one or more estimation modules of the estimation unit 130). The depicted estimator reset message 212 may instruct one or more estimator modules to reset the values of certain variables and calculations, and to re-initialize or re-perform estimates if certain re-plans or changes to the consist 104 occur. For example, if a re-plan is performed due to a revised estimate of mass, the air brake estimator module 138 and the DB estimator module 136 may be reset, as the air brake estimator module 138 and the DB estimator module 136 previously made estimates using a value for mass that has been changed. As another example, if units are added to the consist 104 (or removed from the consist 104), the air brake estimator module 138 will be reset as the consist 104 is now longer (or shorter), with the length of the consist 104 affecting the air brake force.

Figure 3:
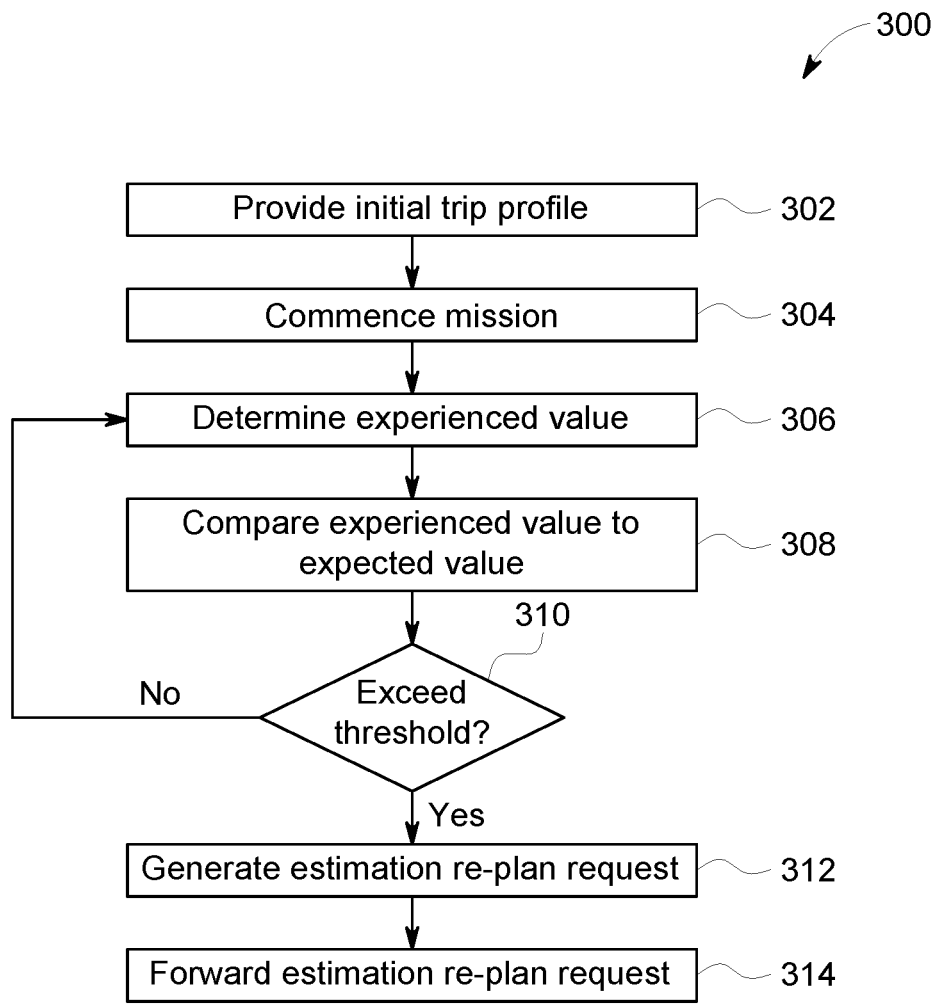
FIG. 3 illustrates a flowchart of a method for generating an estimation re-plan request, according to an embodiment of the invention.

FIG. 3 illustrates a flowchart of a method 300 for generating an estimation re-plan request in accordance with one example of the present inventive subject matter. The method may be performed, for example, using certain components, equipment, structures, or other aspects of embodiments discussed above. In certain embodiments, certain steps may be added or omitted, certain steps may be performed simultaneously or concurrently with other steps, certain steps may be performed in different order, and certain steps may be performed more than once, for example, in an iterative fashion. In various embodiments, portions, aspects, and/or variations of the method may be able to be used as one or more algorithms to direct hardware to perform operations described herein.

At 302, an initial trip profile is provided. The trip profile may be based on expected values for one or more estimated parameters, such as mass, horsepower, air braking capability, or dynamic braking capability. The trip profile may specify power settings at various portions along a route for one or more powered vehicles. At 304, a mission is commenced pursuant to the trip profile.

At 306, during performance of the mission, an experienced value for one of the parameters used to plan the trip profile is estimated or determined using information acquired or obtained during the performance of the mission. As just one example, information regarding speed, acceleration, or the like may be collected or detected during the mission, and used to determine an experienced mass of a vehicle system using physics based calculations regarding the motion of the vehicle system. The experienced value may be determined continuously, at predetermined intervals, or responsive to an event. For example, a dynamic braking capability estimate may be determined during application of dynamic brakes, but not at times when the dynamic brakes are not activated. As another example, a horsepower estimate may be determined when a throttle is at a relatively high setting (e.g., 7 or 8), but not when the throttle is at lower settings.

At 308, the experienced value is compared to the corresponding expected or previous value used to plan the trip profile currently used (e.g., the trip profile in use during acquisition of the information used to determine or estimate the experienced value). Thus, an expected value may be a value used to prepare an initial trip profile before commencement of a mission, or may be a value used in a subsequent re-plan of a trip profile currently in use. An estimator module may obtain the expected value or value used by the most recent trip plan, and compare the expected value to the corresponding value determined at 306.

At 310, it is determined if the difference satisfies a threshold criterion. For example, if the difference between the expected and experienced values is relatively small (e.g., small enough so that a re-plan may not be desired), the method 300 may return to 306 for continued monitoring of one or more estimated parameters. If the difference satisfies the threshold criterion (e.g., the difference is large enough to justify the effort required for a re-plan or a re-plan is otherwise desirable), then at 312 the estimation re-plan request is generated. The re-plan request may specify the type of re-plan (e.g., an identification of the estimated parameter on which the re-plan is based, such as mass), as well as a suggested or requested parameter value (e.g., a value of the mass corresponding to the experienced value) to be used as part of the request re-plan. At 314, the estimation re-plan request is forwarded, for example, to an arbiter module (e.g., arbiter module 126).

Figure 4:
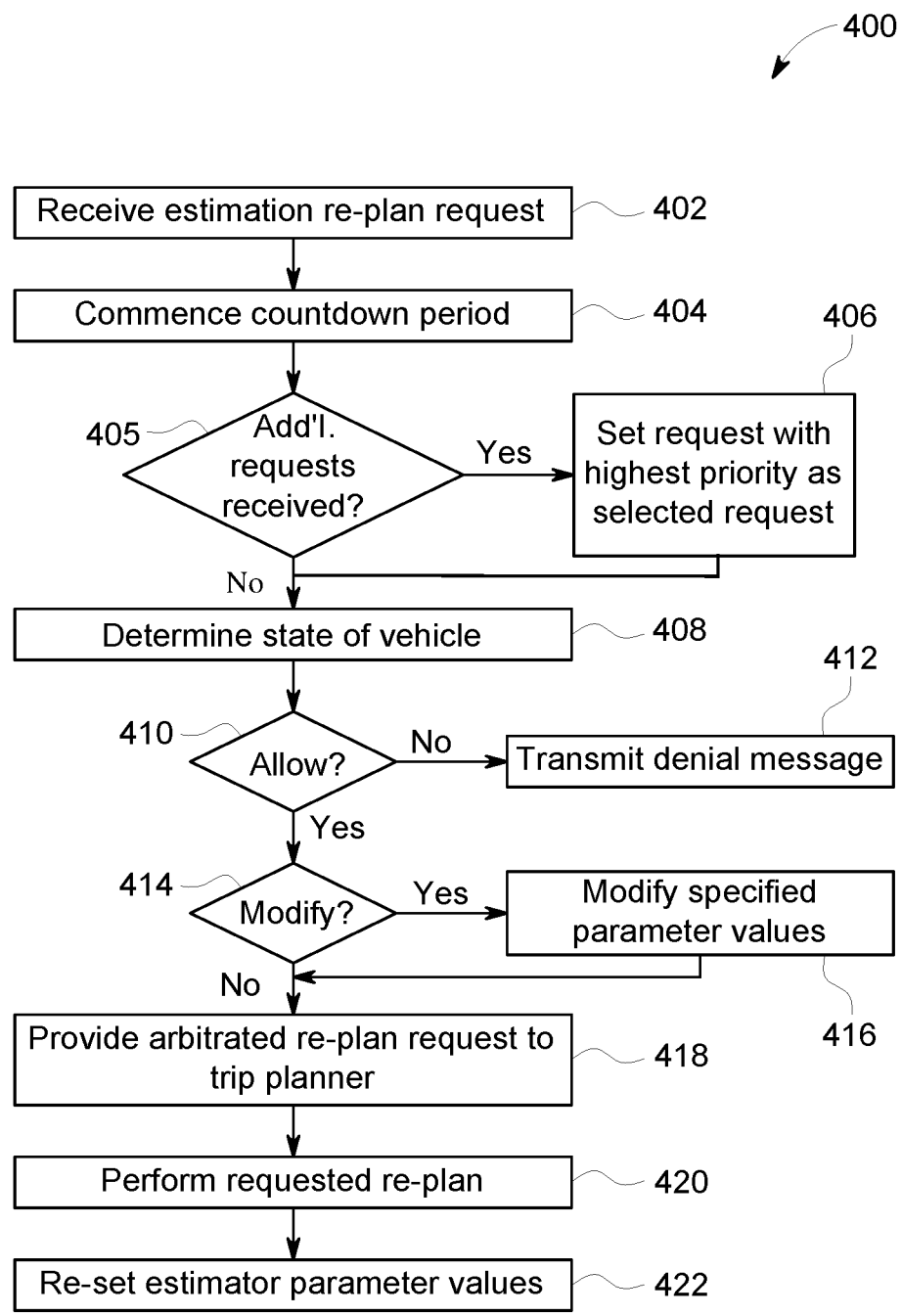
FIG. 4 illustrates a flowchart of a method for determining whether to perform an estimation re-plan, according to an embodiment of the invention.

FIG. 4 illustrates a flowchart of a method 400 for determining whether to perform an estimation re-plan in accordance with one example of the present inventive subject matter. The method may be performed, for example, using certain components, equipment, structures, or other aspects of embodiments discussed above. In certain embodiments, certain steps may be added or omitted, certain steps may be performed simultaneously or concurrently with other steps, certain steps may be performed in different order, and certain steps may be performed more than once, for example, in an iterative fashion. In various embodiments, portions, aspects, and/or variations of the method may be able to be used as one or more algorithms to direct hardware to perform operations described herein.

At 402, an estimation re-plan request is received. For example, an estimation re-plan request (e.g., a request generated at 312 and forwarded at 314) may be received by an arbiter module of an energy management processing unit as discussed herein. The estimation re-plan request may specify a type of request (e.g., based on parameter to be modified for re-planning such as mass or horsepower, among others) and a suggested or proposed new value to be used in re-planning. For example, a mass estimation request based on a determined or estimated experienced mass may specify the value of the experienced mass as a value to be used in re-planning a trip.

At 404, a countdown period is commenced. The countdown period may have a predetermined duration, such as one minute or two minutes, among others. During the countdown period, any additional estimation re-plan requests (e.g., requests from a different estimator module and/or corresponding to a different planning parameter to be varied than the request received at 402) are collected.

At 405, it is determined if one or more additional estimation re-plan requests have been received during the countdown period. If other estimation re-plan requests were received, the method 400 proceeds to 406. At 406, the estimation re-plan request having a highest priority is selected for further evaluation. A message may be sent to any estimators providing requests having a lower priority, informing the estimators that the corresponding requests were denied, and the estimators having denied request may re-evaluate the requests (e.g., using new parameters corresponding to the selected request). The priority may be based, for example, on reliability of the estimates, and/or on whether a given estimator module uses a value from another estimate as discussed herein. It may be noted that, in some embodiments, more than one request may be selected. For example, certain estimates may not conflict with, depend upon, or otherwise relate to each other so that corresponding re-plan requests for each estimate may be implemented at or near the same time. If no other requests are received during the countdown period, the only received request may be identified as the selected request and the method 400 may proceed to 408.

At 408, the state of the vehicle is determined. The state of the vehicle may be utilized, for example, to determine whether to deny, accept, or modify the selected estimation re-plan request. The state of the vehicle may describe, for example, whether the air brakes are currently applied (and/or would be applied at the time of a requested re-plan), whether the dynamic brakes are currently applied (and/or would be applied at the time of a requested re-plan), whether the throttle is in a relatively high state, or the like (and/or would be applied at the time of a requested re-plan).

At 410, it is determined if the selected request is to be allowed. For example, if the selected request is for an air brake re-plan and the air brakes are expected to be applied during the re-plan or at a close period in time to the re-plan (e.g., shortly after the re-plan at a time when control signals from the re-plan will be initially implemented in controlling the vehicle), the selected request may be denied, and the method 400 may proceed to 412. At 412, a message indicating the denial of the request is transmitted to the appropriate estimator module(s). The appropriate estimator module(s) may re-evaluate the request, for example at a later time after the vehicle is no longer in the state preventing the implementation of the re-plan request.

If, at 410, it is determined to allow the selected request, the method 400 may proceed to 414, where it is determined if one or more parameters specified by the estimation re-plan request are to be modified. For example, if the vehicle system is operating at a relatively high throttle level, requests specifying changes to parameters that would result in undesirably abrupt changes in vehicle operation may be modified to specify values that may provide slightly less accurate estimates but provide for smoother operation of the vehicle system. If modification is to be performed, the method 400 proceeds to 416 and the specified parameter value(s) are modified. If modification is not to be performed, the method 400 proceeds to 418.

At 418, an arbitrated re-plan request is provided to a trip planner. The arbitrated re-plan request may include one or more requests received during a countdown period, and may specify a parameter value that is the same as a value specified by an estimation re-plan request, or that may be modified from the value of the estimation re-plan request. It may be noted that the re-plan request may be provided directly to the trip planner in some embodiments, and indirectly in others (e.g., the request may be provided to a supervisor module as discussed herein for determination of whether or not the request is forwarded to a trip planner).

At 420, the requested re-plan is performed. The re-plan may be performed using a value of a parameter specified by the arbitrated re-plan request (e.g., a value that has been modified at 416). At 422, after the requested re-plan is implemented, one or more values of parameters used by estimators may be re-set to values used in implementing the re-plan at 420. For example, if a mass estimate is revised, one or more estimator modules (e.g., air brake estimator module) may receive the revised mass estimate value and use the mass estimate for future estimates. As another example, the "expected" or "current" value to which an estimator compares an experienced value to may be changed to reflect the value used for the most recent re-plan. For instance, after a mass estimate re-plan, the mass estimator module may use the most recent mass estimate used in a re-plan as the "expected" mass.

Thus, various examples of the inventive subject matter provide for improved trip planning, for example by improving the accuracy or reliability of values used to plan or re-plan a trip.

In an embodiment, a system comprises a processing unit (e.g., an energy management processing unit) configured to be disposed onboard a vehicle system. The processing unit comprises a first module (e.g., a trip planning module) configured to plan a trip profile specifying power settings (and/or other settings) for performing a mission based on trip data. The trip data includes a plurality of parameters having expected values. The processing unit further comprises one or more second modules (e.g., estimator modules) configured to: estimate respective experienced values of the plurality of parameters used by the first module to plan the trip profile; determine respective differences between the experienced values and the expected values; and generate respective re-plan requests (e.g., estimation re-plan requests) of the trip profile when any of the differences exceed respective thresholds. The processing unit further comprises a third module (e.g., an arbiter module) configured to: receive the re-plan requests from the one or more second modules; determine whether a re-plan is to be performed pursuant to a first one of the re-plan requests based on at least one of a state of the vehicle system and/or an additional one or more of the re-plan requests; and provide an arbitrated re-plan request to the first module for re-planning the trip profile when a determination is made by the third module that the re-plan is to be performed.

In one example of the inventive subject matter, a system includes an energy management processing unit. The energy management processing unit is configured to be disposed onboard a vehicle system, and includes a trip planning module, a plurality of estimator modules, and an arbiter module. The trip planning module is configured to plan a trip profile specifying power settings for performing a mission based on trip data including a plurality of parameters having expected values. The estimator modules are configured to estimate respective experienced values of the plurality of parameters used by the trip planning module to plan the trip profile, determine respective differences between the experienced values and the expected values, and generate respective estimation re-plan requests of the trip profile when any of the differences exceed respective thresholds. The arbiter module is configured to receive the estimation re-plan requests from the plurality of estimator modules, determine whether a re-plan is to be performed pursuant to a first one of the estimation re-plan requests based on at least one of a state of the vehicle system or an additional one or more of the estimation re-plan requests, and provide an arbitrated re-plan request to the trip planning module for re-planning the trip profile when a determination is made by the arbiter module that the re-plan is to be performed.

In one aspect, the arbiter module is configured to select among the estimation re-plan requests based on a predetermined priority ranking.

In one aspect, the arbiter module is configured to select the first estimation re-plan request over a second one of the estimation re-plan requests when one or more of the parameters corresponding to the second estimation re-plan request depend on one or more of the parameters specified by the first estimation re-plan request.

In one aspect, the arbiter module is configured to select the first estimation re-plan request over a second one of the estimation re-plan requests when the first estimation re-plan request is determined to be more reliable than the second estimation re-plan request.

In one aspect, the arbiter module is configured to adjust a value of the first estimation re-plan request to provide a corresponding modified value for the arbitrated re-plan request. For example, in one aspect, the arbiter module is configured to adjust the value of the first estimation re-plan request based on the state of the vehicle system.

In one aspect, the system further includes a supervisor module. The supervisor module is configured to receive the arbitrated re-plan request from the arbiter module and determine whether to forward the arbitrated re-plan request to the trip planning module based on a planning state of the vehicle system.

In one example of the inventive subject matter, a method includes obtaining, with one or more processors, a first estimation re-plan request, the first estimation re-plan request based on a difference between an expected value and an experienced value of a parameter used to generate a trip profile for a vehicle system. The method also includes determining, with the one or more processors, whether a re-plan is to be performed pursuant to the first estimation re-plan request based on at least one of a state of the vehicle system or one or more additional estimation re-plan requests. Further, the method includes generating an arbitrated re-plan request for re-planning the trip profile when it is determined to perform the re-plan.

In one aspect, determining whether a re-plan is to be performed includes selecting among a plurality of estimation re-plan requests, the plurality of estimation re-plan requests including the first estimation re-plan requests and the one or more additional estimation re-plan requests, based on a predetermined priority ranking.

In one aspect, the method includes selecting the first estimation re-plan request over a second estimation re-plan request of the one or more additional estimation re-plan requests when one or more parameters corresponding to the second estimation re-plan request depend on one or more parameters specified by the first estimation re-plan request.

In one aspect, the method includes selecting the first estimation re-plan request over a second estimation re-plan request of the one or more additional estimation re-plan requests when the first estimation re-plan request is determined to be more reliable than the second estimation re-plan request.

In one aspect, the method includes adjusting a value of the first estimation re-plan request to provide a corresponding modified value for the arbitrated re-plan request. For example, in one aspect, the adjusting the value is performed based on the state of the vehicle system.

In one aspect, the method includes determining, with the one or more processors, whether the arbitrated re-plan request is implemented based on a planning state of the vehicle system.

In one example of the inventive subject matter, a tangible and non-transitory computer readable medium includes one or more computer software modules configured to direct one or more processors to obtain a first estimation re-plan request, the first estimation re-plan request based on a difference between an expected value and an experienced value of a parameter used to generate a trip profile for a vehicle system. The one or more computer software modules are also configured to direct the one or more processors to determine whether a re-plan is to be performed pursuant to the first estimation re-plan request based on at least one of a state of the vehicle system or one or more additional estimation re-plan requests. The one or more computer software modules configured to direct one or more processors to generate an arbitrated re-plan request for re-planning the trip profile when it is determined to perform the re-plan.

In one aspect, the one or more computer software modules are configured to direct the one or more processors to select among a plurality of estimation re-plan requests, the plurality of estimation re-plan requests including the first estimation re-plan requests and the one or more additional estimation re-plan requests, based on a predetermined priority ranking.

In one aspect, the one or more computer software modules are configured to direct the one or more processors to select the first estimation re-plan request over a second estimation re-plan request of the one or more additional estimation re-plan requests when one or more parameters corresponding to the second estimation re-plan request depend on one or more parameters specified by the first estimation re-plan request.

In one aspect, the one or more computer software modules are configured to direct the one or more processors to select the first estimation re-plan request over a second estimation re-plan request of the one or more additional estimation re-plan requests when the first estimation re-plan request is determined to be more reliable than the second estimation re-plan request.

In one aspect, the one or more computer software modules are configured to adjust a value of the first estimation re-plan request to provide a corresponding modified value for the arbitrated re-plan request. For example, in one aspect, the one or more computer software modules are configured to adjust the value based on a state of the vehicle system.

It should be noted that the particular arrangement of components (e.g., the number, types, placement, or the like) of the illustrated embodiments may be modified in various alternate embodiments. For example, in various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), one or more aspects of one or more modules may be shared between modules, a given module or unit may be added, or a given module or unit may be omitted.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation.

Various components and modules described herein may be implemented as part of one or more computers, computing systems, or processors. The computer, computing system, or processor may include a microprocessor. The microprocessor may be connected to a communication bus. The computer or processor may also include a memory. The memory may include Random Access Memory (RAM) and Read Only Memory (ROM). The computer or processor further may include a storage system or device, which may be a hard disk drive or a removable storage drive such as a floppy or other removable disk drive, optical disk drive, and the like. The storage system may also be other similar means for loading computer programs or other instructions into the computer or processor. The instructions may be stored on a tangible and/or non-transitory computer readable storage medium coupled to one or more servers. As used herein, the term "computer" or "computing system" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer" or "computing system."

The set of instructions or modules may include various commands that instruct the controller, computer or processor as a processing machine to transform information and/or perform specific operations such as the methods and processes described herein. The set of instructions may be in the form of a software program. The software may be in the form of a collection of separate programs, a program module within a larger program or a portion of a program module. An example of modular programming may be in the form of object-oriented programming. The processing of input data by the processing machine may be in response to user commands, or in response to results of previous processing, or in response to a request made by another processing machine.

As used herein, the terms "system," "unit," and "module" include a hardware and/or software system that operates to perform one or more functions. For example, a system, unit, or module may include electronic circuitry that includes and/or is coupled to one or more computer processors, controllers, or other logic based devices that perform operations based on instructions stored on a tangible and non-transitory computer readable storage medium, such as a computer memory. Alternatively, a system, unit, or module may include a hard-wired device that performs operations based on hard-wired logic of the device. The systems, units, or modules shown in the attached figures may represent the hardware that operates based on software or hardwired instructions, the software that directs hardware to perform the operations, or a combination thereof "Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f) unless and until such claim limitations expressly use the phrase "means for" followed by a statement of function void of further structure.

This written description uses examples to disclose the invention and to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

The invention claimed is:

1. A system comprising:
an energy management processing unit configured to be disposed onboard a vehicle system, the energy management processing unit comprising one or more processors configured to:
plan a trip profile specifying power settings for performing a mission based on trip data, the trip data including a plurality of parameters having expected values;
estimate respective experienced values of the plurality of parameters used by the trip planning module to plan the trip profile, determine respective differences between the experienced values and the expected values, and generate respective estimation re-plan requests of the trip profile when any of the differences exceed respective thresholds;
based on the estimation re-plan requests, select a re-plan request from among a first one of the estimation re-plan requests or an additional one or more of the estimation re-plan requests, prior to performing a re-plan of the trip profile, and provide the selected re-plan request to the trip planning module for re-planning the trip profile based on the selected re-plan request; and
control the vehicle system based on the re-planned trip profile.

2. The system of claim 1, wherein the one or more processors is configured to select among the estimation re-plan requests based on a predetermined priority ranking.

3. The system of claim 2, wherein the one or more processors is configured to select the first estimation re-plan request over a second one of the estimation re-plan requests when one or more of the parameters corresponding to the second estimation re-plan request depend on one or more of the parameters specified by the first estimation re-plan request.

4. The system of claim 2, wherein the one or more processors is configured to select the first estimation re-plan request over a second one of the estimation re-plan requests when the first estimation re-plan request is determined to be more reliable than the second estimation re-plan request.

5. The system of claim 1, wherein the one or more processors is configured to adjust a value of the first estimation re-plan request to provide a corresponding modified value for the arbitrated re-plan request.

6. The system of claim 5, wherein the one or more processors is configured to adjust the value of the first estimation re-plan request based on the state of the vehicle system.

7. The system of claim 1, wherein the one or more processors is configured to determine whether to forward the arbitrated re-plan request to the trip planning module based on a planning state of the vehicle system.

8. The system of claim 1, wherein the one or more processors is further configured to commence a countdown period after receiving the first one of the estimation re-plan requests and before implementing the first one of the estimation re-plan requests, and to select the selected re-plan request from among the first one of the estimation re-plan requests and other re-plan requests received during the countdown period.

9. A method comprising:
obtaining, with one or more processors, a first estimation re-plan request for re-planning a trip profile, the first estimation re-plan request based on a difference between an expected value and an experienced value of a parameter used to generate the trip profile for a vehicle system;
obtaining, with the one or more processors, one or more additional estimation re-plan requests based on a difference of one or more expected and experienced values of one or more respective additional parameters used to generate the trip profile;
selecting, with the one or more processors, a re-plan request from among the first estimation re-plan request or the one or more additional estimation re-plan requests, prior to performing a re-plan of the trip profile;

re-planning the trip profile based on the selected re-plan request; and controlling the vehicle system based on the re-planned trip profile.

10. The method of claim 9, wherein selecting the re-plan request is performed based on a predetermined priority ranking.

11. The method of claim 10, comprising selecting the first estimation re-plan request over a second estimation re-plan request of the one or more additional estimation re-plan requests when one or more parameters corresponding to the second estimation re-plan request depend on one or more parameters specified by the first estimation re-plan request.

12. The method of claim 10, comprising selecting the first estimation re-plan request over a second estimation re-plan request of the one or more additional estimation re-plan requests when the first estimation re-plan request is determined to be more reliable than the second estimation re-plan request.

13. The method of claim 9, comprising adjusting a value of the first estimation re-plan request to provide a corresponding modified value for the arbitrated re-plan request.

14. The method of claim 13, wherein the adjusting the value is performed based on the state of the vehicle system.

15. The method of claim 9, comprising determining, with the one or more processors, whether the arbitrated re-plan request is implemented based on a planning state of the vehicle system.

16. A tangible and non-transitory computer readable medium comprising one or more computer software modules configured to direct one or more processors to:

obtain a first estimation re-plan request for a re-planning a trip profile, the first estimation re-plan request based on a difference between an expected value and an experienced value of a parameter used to generate the trip profile for a vehicle system;

obtain, with the one or more processors, one or more additional estimation re-plan requests based on a difference of one or more expected and experienced values of one or more respective additional parameters used to generate the trip profile;

select a re-plan request from among the first estimation re-plan request or the one or more additional estimation re-plan requests, prior to performing a re-plan of the trip profile;

re-plan the trip profile based on the selected re-plan request; and control the vehicle system based on the re-planned trip profile.

17. The tangible and non-transitory computer readable medium of claim 16, wherein the one or more computer software modules are configured to direct the one or more processors to select the selected re-plan request based on a predetermined priority ranking.

18. The tangible and non-transitory computer readable medium of claim 17, wherein the one or more computer software modules are configured to direct the one or more processors to select the first estimation re-plan request over a second estimation re-plan request of the one or more additional estimation re-plan requests when one or more parameters corresponding to the second estimation re-plan request depend on one or more parameters specified by the first estimation re-plan request.

19. The tangible and non-transitory computer readable medium of claim 17, wherein the one or more computer software modules are configured to direct the one or more processors to select the first estimation re-plan request over a second estimation re-plan request of the one or more additional estimation re-plan requests when the first estimation re-plan request is determined to be more reliable than the second estimation re-plan request.

20. The tangible and non-transitory computer readable medium of claim 16, wherein the one or more computer software modules are configured to adjust a value of the first estimation re-plan request to provide a corresponding modified value for the arbitrated re-plan request.

21. The tangible and non-transitory computer readable medium of claim 20, wherein the one or more computer software modules are configured to adjust the value based on a state of the vehicle system.

* * * * *